(12) United States Patent
Dooley

(10) Patent No.: US 9,657,645 B2
(45) Date of Patent: May 23, 2017

(54) ENGINE ARCHITECTURE USING ELECTRIC MACHINE

(71) Applicant: PRATT & WHITNEY CANADA CORP., Longueuil (CA)

(72) Inventor: Kevin A. Dooley, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 133 days.

(21) Appl. No.: 13/775,360

(22) Filed: Feb. 25, 2013

(65) Prior Publication Data

US 2014/0291987 A1 Oct. 2, 2014

(51) Int. Cl.
| F02C 7/275 | (2006.01) |
| F01D 15/10 | (2006.01) |
| H02K 7/18 | (2006.01) |
| H02K 16/04 | (2006.01) |
| H02K 7/14 | (2006.01) |

(52) U.S. Cl.
CPC .............. *F02C 7/275* (2013.01); *F01D 15/10* (2013.01); *H02K 7/1823* (2013.01); *H02K 16/04* (2013.01); *F05D 2220/76* (2013.01); *H02K 7/14* (2013.01); *H02K 2213/06* (2013.01)

(58) Field of Classification Search
CPC ........... F02C 7/275; F01D 15/10; H02K 7/18; H02K 16/04; H02K 7/1823; H02P 1/16
USPC .................................................... 290/1 A, 52
See application file for complete search history.

(56) References Cited

U.S. PATENT DOCUMENTS

| 5,512,811 | A * | 4/1996 | Latos et al. ..................... 322/10 |
| 5,764,036 | A * | 6/1998 | Vaidya et al. .................. 322/90 |
| 6,906,447 | B2 * | 6/2005 | Leijon et al. ................. 310/196 |
| 6,936,948 | B2 | 8/2005 | Bell et al. |
| 6,965,183 | B2 | 11/2005 | Dooley |
| 7,126,313 | B2 | 10/2006 | Dooley |
| 7,259,491 | B2 * | 8/2007 | Leijon et al. ................. 310/196 |
| 7,312,550 | B2 | 12/2007 | Dooley |
| 7,576,508 | B2 * | 8/2009 | Xu et al. ....................... 318/541 |
| 7,583,063 | B2 | 9/2009 | Dooley |
| 7,621,117 | B2 | 11/2009 | Dooley et al. |
| 7,687,928 | B2 * | 3/2010 | Taneja et al. ............... 290/36 R |
| 7,709,980 | B2 | 5/2010 | Dooley |
| 7,919,894 | B2 | 4/2011 | Dooley |
| 8,097,968 | B2 * | 1/2012 | Anghel et al. ................. 290/31 |
| 8,115,434 | B2 * | 2/2012 | El-Antably et al. ..... 318/400.14 |
| 2004/0066176 | A1 * | 4/2004 | Gupta et al. .................... 322/10 |
| 2007/0296215 | A1 * | 12/2007 | Dooley .......................... 290/28 |

(Continued)

*Primary Examiner* — Viet Nguyen
(74) *Attorney, Agent, or Firm* — Norton Rose Fulbright Canada LLP

(57) ABSTRACT

There is described a method for controlling an engine and a system architecture for an engine. The system architecture comprises a first electric machine having a single rotor dual stator configuration for operating as a starter-generator for the engine; a second electric machine having a single rotor dual stator configuration for operating as a motor; a dual channel motor drive unit coupled to the second electric machine; a dual channel power control unit coupled to the first electric machine and the motor drive unit; a dual channel full authority digital engine control (FADEC) coupled to the dual channel power control unit and the dual channel motor drive unit; and at least two accessories coupled to the second electric machine and driven by motive power from the single rotor of the second electric machine.

11 Claims, 5 Drawing Sheets

(56) References Cited

U.S. PATENT DOCUMENTS

| | | | | |
|---|---|---|---|---|
| 2008/0067984 | A1* | 3/2008 | Anghel et al. | 322/52 |
| 2008/0211237 | A1* | 9/2008 | Berenger | 290/40 B |
| 2009/0289456 | A1* | 11/2009 | McLoughlin et al. | 290/46 |
| 2010/0295301 | A1* | 11/2010 | Huang et al. | 290/31 |
| 2013/0125561 | A1* | 5/2013 | Schwarz et al. | 60/802 |
| 2014/0260306 | A1* | 9/2014 | Dooley | F02C 7/26 60/778 |

* cited by examiner

ENGINE ARCHITECTURE USING ELECTRIC MACHINE

TECHNICAL FIELD

The application relates generally to engine architectures and more particularly, to designs incorporating electric machines such as alternators and motors.

BACKGROUND OF THE ART

The demand for electrical power onboard modern aircrafts is increasing. New avionic equipment and more onboard entertainment systems also need more power. With more power generation capability in the engines, the trend is to unify the on board power systems to electrical power only, eliminating pneumatic and hydraulic power systems. The operation of engine accessories using electrical power may also have its advantages. Reliability and health monitoring when dual redundant electrical systems can be implemented is a prime advantage of electrically driven systems which may be more weight and cost effective than with other types of power systems. Therefore, there is a need for continued improvements to the design of dual redundant systems using electric machines.

SUMMARY

In one aspect, there is provided a gas turbine engine comprising: a first electric machine having a single rotor dual stator configuration for operating as a starter-generator for the engine; a second electric machine having a single rotor dual stator configuration for operating as a motor; a dual channel motor drive unit coupled to the second electric machine; a dual channel power control unit coupled to the first electric machine and the motor drive unit; a dual channel full authority digital engine control (FADEC) coupled to the dual channel power control unit and the dual channel motor drive unit; and at least two accessories coupled to the second electric machine and driven by motive power from the single rotor of the second electric machine.

In another aspect, there is provided a method of controlling an engine, the method comprising: operating a first rotor in a first electric machine having a single rotor dual stator configuration to rotate the first rotor and thereby start the engine; once the engine is started, providing a first power source and a second power source from an interaction of a magnetic field of the first rotor with the dual stator in the first electric machine; channeling the first power source towards a second electric machine having a single rotor dual stator configuration via a dual channel power control unit and a dual channel motor drive unit; channeling the second power source towards the second electric machine independently from the first power source via the dual channel power control unit and the dual channel motor drive unit; and driving at least two independent accessories by applying the first power source and the second power source to a second rotor of the second electric machine via the single rotor dual stator configuration.

In yet another aspect, there is provided an oil and fuel control system for an engine, the system comprising: an electric machine having a single rotor coupled to a dual channel stator comprising a first stator and a second stator, for operating as a motor to generate motive power; a dual channel motor drive unit coupled to the electric machine; a dual channel full authority digital engine control (FADEC) coupled to the dual channel motor drive unit; an oil delivery system comprising an oil pump and oil accessories, coupled to the single rotor of the electric machine; and a fuel delivery system comprising a fuel pump and fuel accessories, coupled to the single rotor of the electric machine. The fuel delivery system may be a demand fuel system which is controlled by the speed of the motor.

DESCRIPTION OF THE DRAWINGS

Reference is now made to the accompanying figures in which.

DETAILED DESCRIPTION

Figure 1:
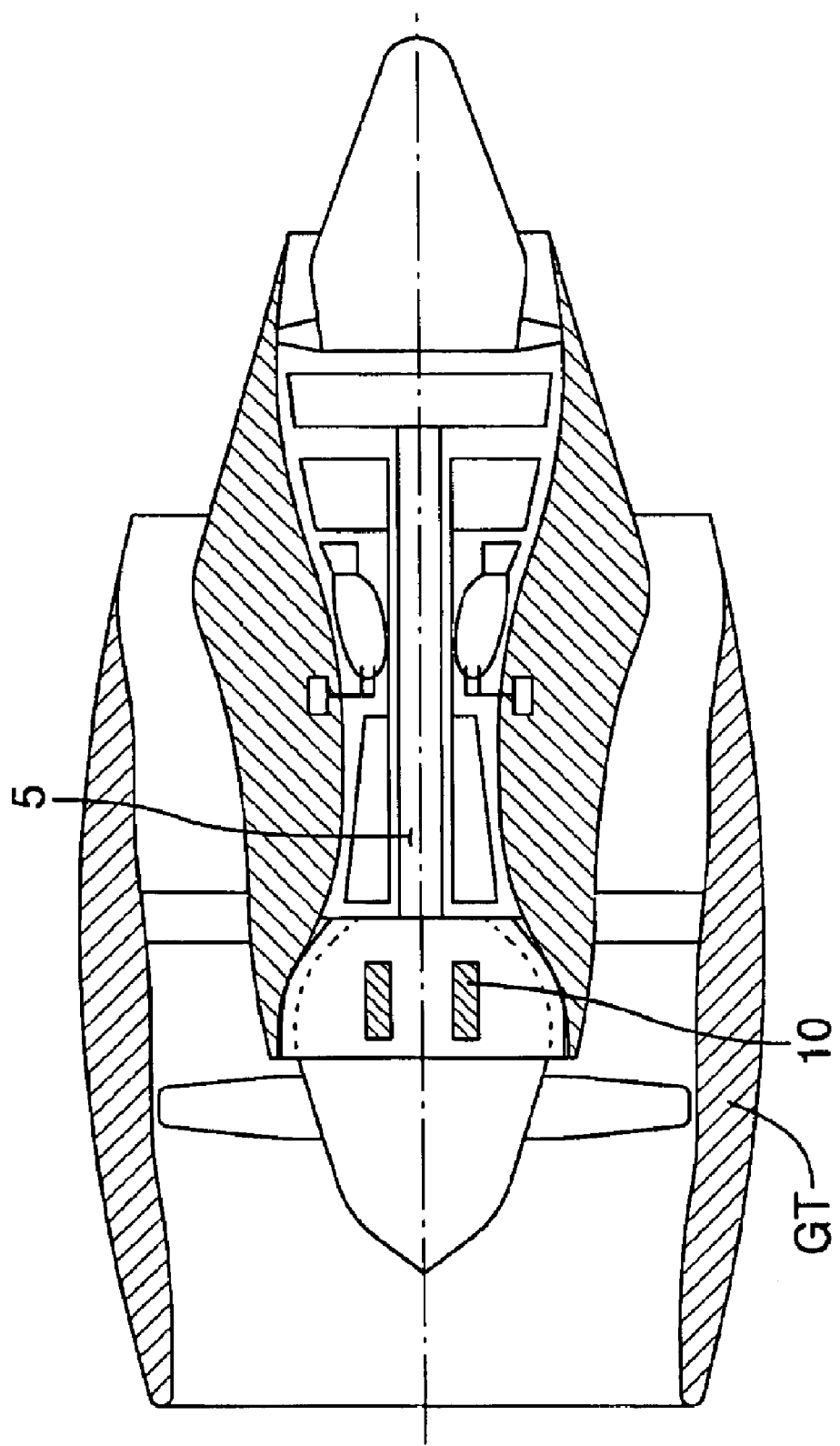
FIG. 1 shows a schematic cross-sectional view of an example of a gas turbine engine with an electric machine integrated therein.

There is described herein a system architecture for incorporating into an engine. FIG. 1 illustrates an exemplary gas turbine (GT) engine. An electric machine 10 driven by a shaft 5 operates within the gas turbine engine. Although the illustrated gas turbine engine is a turbofan, the system as described herein can be employed with a turboprop engine or a turboshaft engine and is not limited to application on aircraft engines. The engine may be an aircraft engine, a ship engine, a vehicle engine, etc. In alternative embodiments, the electric machine 10 may be provided in other types of engines, such as an electric engine and a more-electric engine.

The electric machine 10 is operable as either a motor or a generator, or both, depending on the associated control provided. The materials for the machine 10 may be any deemed suitable by the designer. Some exemplary materials are samarium cobalt permanent magnets, copper power and control windings, a suitable saturable electromagnetic material(s) for the stator teeth and power and control flux buses, such as Hiperco 50 alloy (a trademark of Carpenter Technology Corporation) may be used, although other suitable materials, such as electrical silicon steels commonly used in the construction of electromagnetic machines, may also be used. The rotor can be ferromagnetic, electromagnetic or a permanent magnet, and may be provided in an outside or inside configuration, or any other suitable configuration. The stator teeth, power and control flux buses may be integral or non-integral with one another, as desired.

Figure 2:
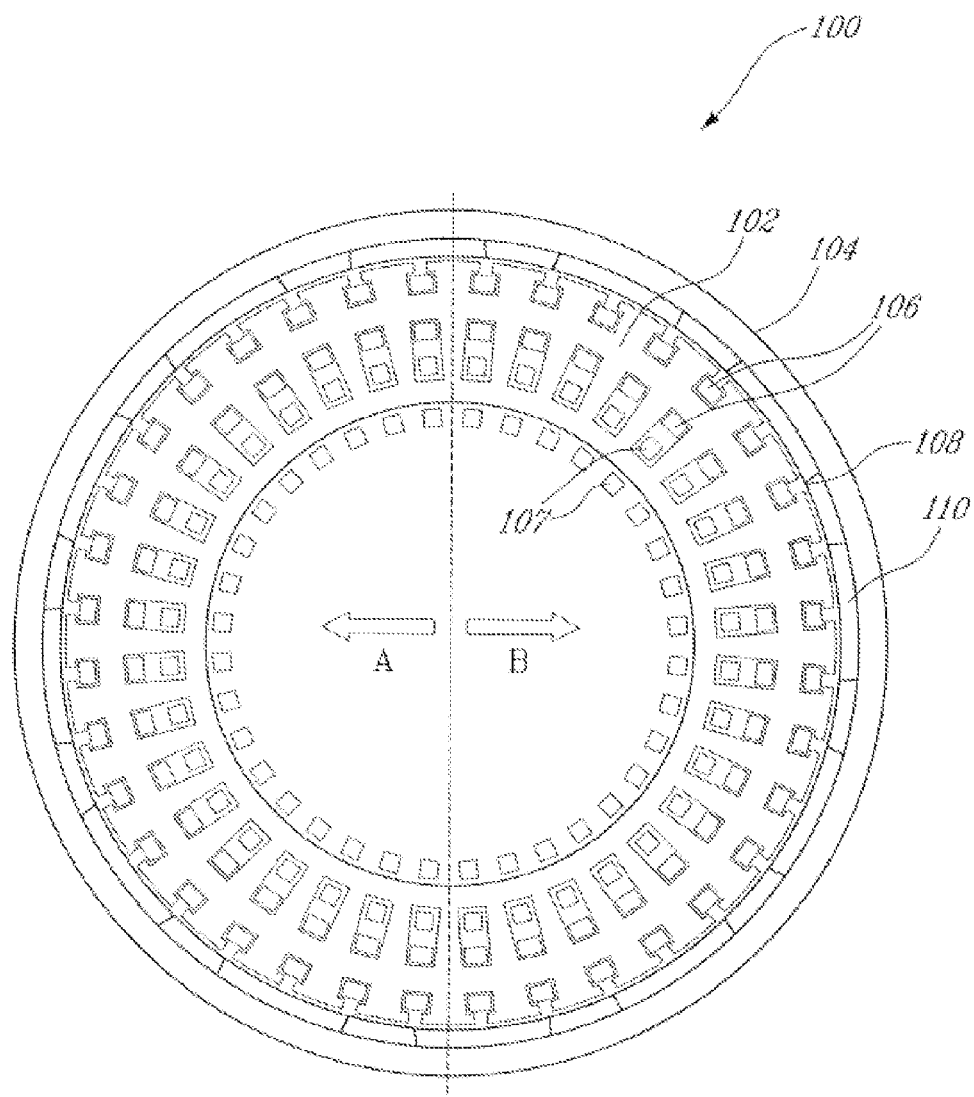
FIG. 2 is a schematic radial cross-sectional view of another example of an electric machine.

While machine 10 may have any suitable configuration, in this example it is illustratively a permanent magnet electric machine. FIG. 2 shows an example of an electric machine 100 described in U.S. Pat. No. 7,262,539, incorporated herein by reference, having two independent channel sections which in essence provide two separately controllable machines, namely machine A and machine B, within the same stator structure 102. The rotor 104 is shown as being outside the stator 102, but it can be inside if desired. Briefly, the stator 102 has a plurality of stator windings 106 provided in slots 108 of stator 102. Permanent magnets 110 are provided on the rotor 104. The channels A, B comprise independent and separated sets of windings 106, and thus machine 100 has a two-in-one electric machine design. The windings of channel A are confined to the sector of the stator indicated as "A" in FIG. 2, while the windings of channel B are confined to the sector of the stator indicated as "B" in FIG. 2. The windings are independently operable by a controller, and may be operated each in a motor and generator mode. For example, rotation of rotor 104 may be used to generate electricity in the windings 106 of channel A, while the windings of channel B are turned "off" via the control coils 107 effect on the magnetic properties of the stator sector. Alternately, the windings of channel B may also be turned "on" and also used to generate electricity in tandem with the windings of channel A. The control of the relevant stator, using DC current in the control winding is useful for both controlling the generator mode of the machine and the motor mode of the machine. In the generator mode of the machine, the DC control current controls the AC output current from the windings as is described in U.S. Pat. No. 7,262,539. In the motor mode, the control current is normally held at a fixed value unless a fault is detected in either the relevant motor winding or in the relevant motor drive circuit, at which point the control current would be set to zero and the relevant motor drive would be shut off, preventing current generated by the continued rotation of the machine from circulating in the fault circuit. The non-failed motor/motor drive channel is used to continue the rotation of the machine to drive the accessories, while repairs/replacement would be made at the next earliest opportunity.

Figure 3:
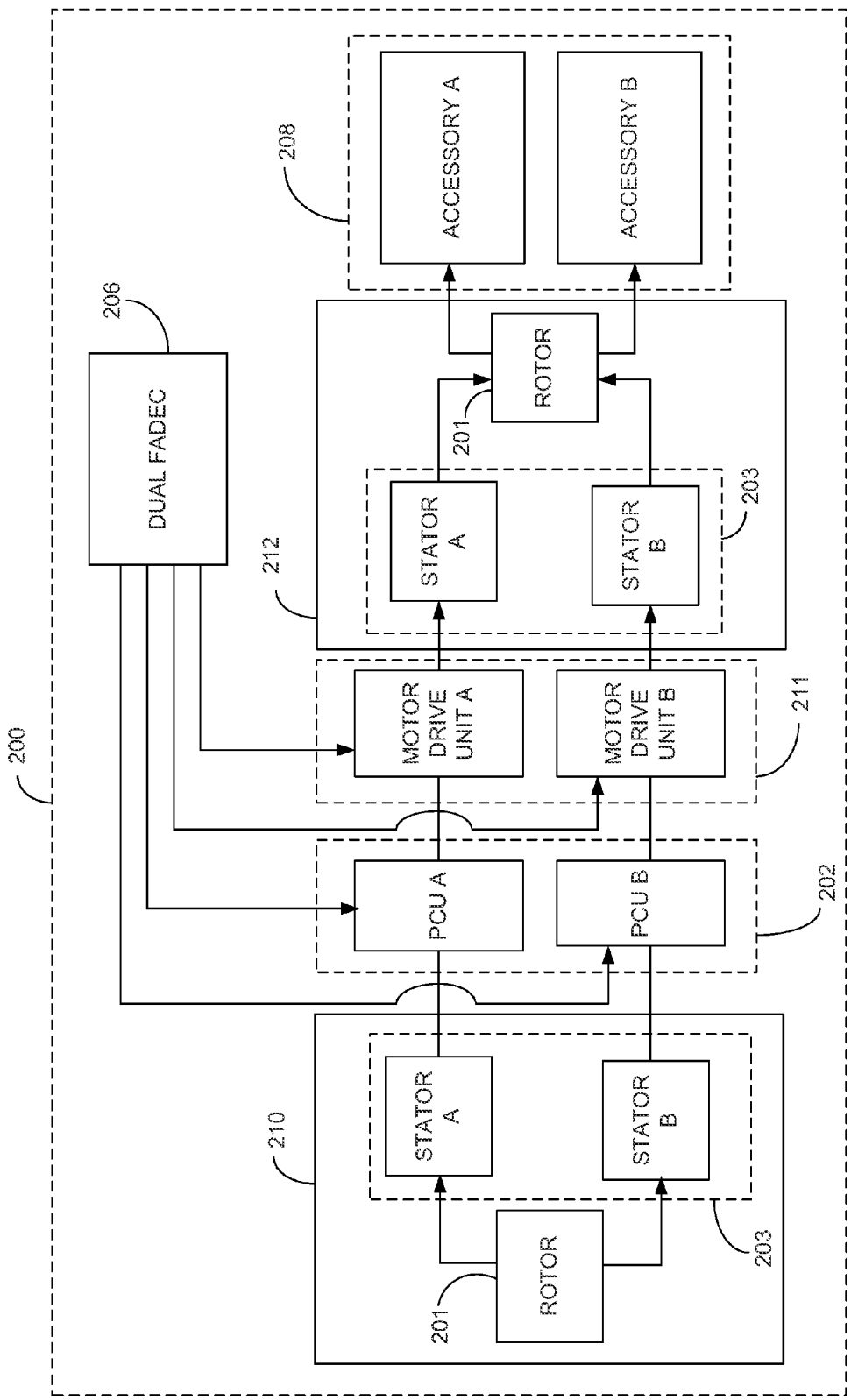
FIG. 3 is a block diagram of an exemplary system architecture using the two dual electric machines.

Turning now to FIG. 3, there is illustrated an exemplary system architecture 200 for an engine incorporating the electric machine 10 described above. In this example, the electric machine 10 operates as a starter-generator 210 and comprises a single rotor 201 dual stator 203 configuration. The starter-generator 210 is used for starting the engine and also generating electricity when the engine is in operation. Two separate sets of stator windings (Stator A, Stator B) 203 are used to drive a common rotor 201. The two stators 203 each output electricity via their respective sets of windings during the generation mode of operation.

The dual channel single rotor starter-generator 210 is controlled by a dual channel full authority digital engine control (FADEC) 206 via a dual channel power control unit (PCU A, PCU B) 202. The FADEC 206 may comprise an electronic engine controller (EEC) or engine control unit (ECU) and its related accessories in order to control all aspects of engine starting performance. In particular, the dual FADEC 206 controls the input current to both starter channels of the starter-generator 210 based on any one of a number of input parameters, such as speed, temperature, altitude, and forward speed.

In the embodiment as illustrated, the electric machine 10 also operates as a motor 212 and comprises a single rotor 201 dual stator 203 configuration. The dual stator is powered via a dual motor drive 211. The single rotor 201 of the motor 212 is coupled to two or more accessories 208. The dual channel single rotor motor 208 is also controlled by the dual channel FADEC 206 via the dual motor drive unit 211. In some embodiments, the single rotor 201 of the motor 212 may be used to drive at least two accessories, such as an oil pump, a fuel pump, a hydraulic pump, etc. This architecture removes several components from the system, such as an additional dual motor and related dual drive system. This improves the overall weight of the system and enhances reliability. The high reliability of the dual electrically driven accessories 208 is achieved by the dual power control unit 202 and dual stators 203 of the starter-generator 210 and the dual motor drive in conjunction with dual stators of the motor 212, while the established high reliability of mechanical rotating machines is capitalized on using a single rotor 201 in both the starter-generator 210 and the motor 212.

Figure 4:
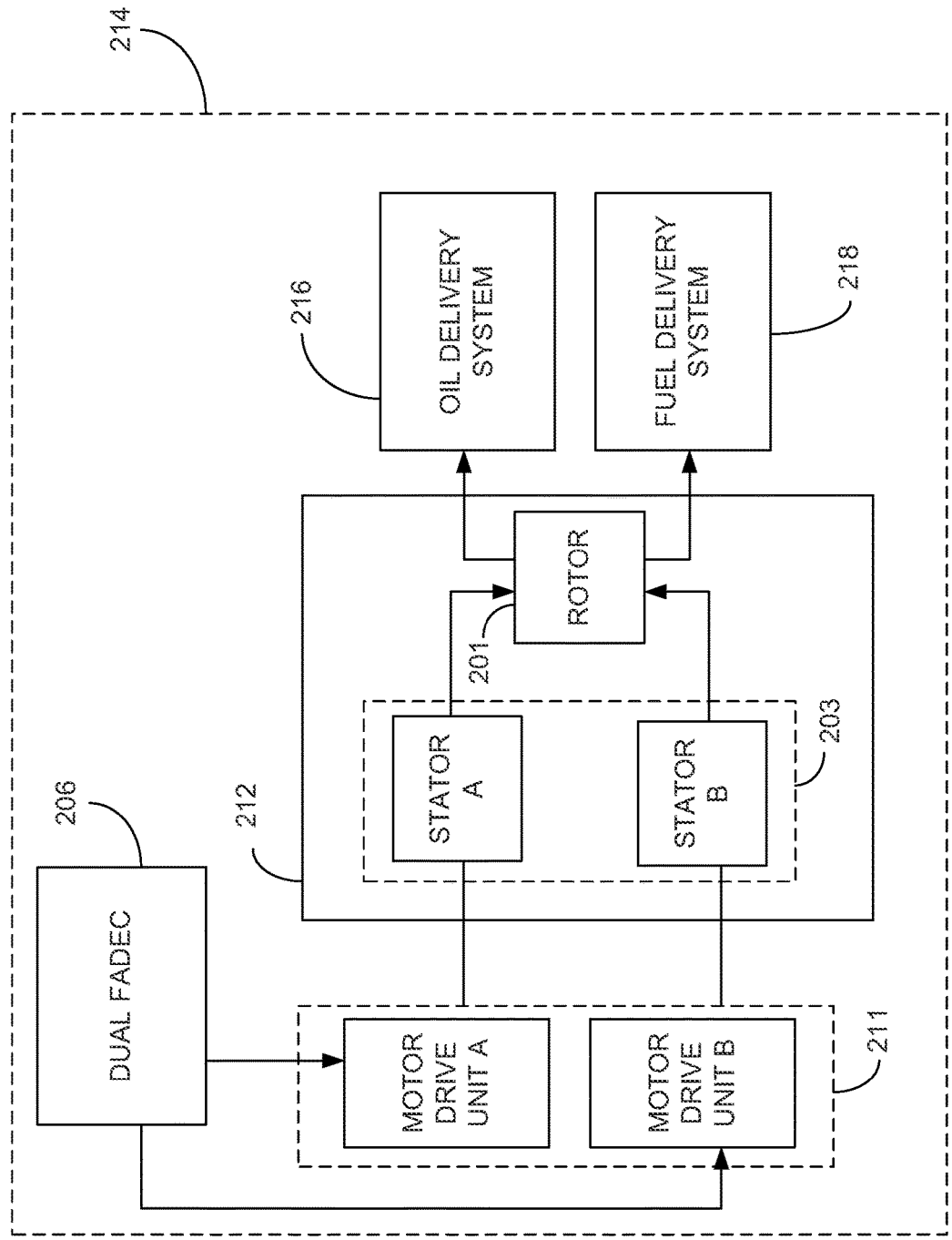
FIG. 4 is a block diagram of an exemplary embodiment for a fuel and oil control system.

In some embodiments, two of the accessories 208 coupled to the motor 212 are an oil delivery system 216 and a fuel delivery system 218. FIG. 4 illustrates a fuel and oil control system 214 as may be used in the system 200 of FIG. 3 in combination with the starter-generator 210 and dual PCU unit 202. Alternatively, control system 214 may be provided independently therefrom in combination with another system configuration and with a plurality of different engine types.

The single rotor 201 of the motor 212 may drive both the oil pump of the oil delivery system 216 and the fuel pump of the fuel delivery system 218 since they require high torque at different times. At high speed (high flow), the fuel pump requires high torque, whereas at low speed the torque is not required for fuel pumping. Cold starting oil pumps require high torque initially and this need diminishes as the oil temperature reaches normal operating temperature, before requiring the torque for the fuel pump operation at high speed.

Referring back to FIG. 3, once the engine has been started, the dual stators 203 in the generator 210, in combination with the dual power control unit 202, provide redundant power to the dual channel single rotor drive motor 212, which provides motive power to the fuel delivery system 218 and the oil delivery system 216 via the single rotor 201 of the motor 212. The fuel flow may be controlled by controlling the speed of the fuel pump in the fuel delivery system 218 by the dual FADEC 206 and/or dual PCU 202, and the oil delivery thus becomes a function of the fuel flow rather than the gas generator speed. Since oil is primarily required for heat removal and heat generation is a strong function of fuel flow, a single dual motor 212 may be used for both oil delivery and fuel delivery. Thus the size of motor required for the oil pump would also be required for the fuel pump, but because the torque duty for each of these systems is asymmetrically complimentary, the requirement for both pumps can be fulfilled with a single motor and drive system. Since this removes many components from the system, the reliability is greatly enhanced as is the overall system weight.

Note that although the electric machine 10 has been illustrated as having dual channels, it may also have more than two channels by providing a single rotor rotating relative to multiple independent stators. In the case of dual channels, the rotor rotates relative to a first "virtual" stator and also relative to a second "virtual" stator. The electric machine 10 is thus a "two-in-one" machine in this case. The output of these two "machines" may then be combined, which permits the option of operating the "two machines" as one. Electric machine 10 may then be connected to fully redundant accessory systems. In a gas turbine integrated starter-generator application, this dual- or multi-channel design permits a fully redundant system with a minimum of hardware, thereby minimizing weight and space and increasing reliability. As well, since generator efficiency is proportional to $I^2$ losses, it is often desirable to run two "machines" like this, each at ½ of the output current, rather than one machine at full output current. Further, power from the two "machines" may be shared, if desired, between the PCUs 202 with the appropriate connections, etc., to permit redundancy in the case of a "machine" or PCU failure.

In some embodiments, the dual channel architecture as depicted in FIG. 3 defines a first channel arrangement composed of the starter-generator 210, the FADEC 206, the power control unit 202, the motor drive unit 211 and the motor 212 that is electrically independent from a second channel arrangement composed of the starter-generator 210, the FADEC 206, the power control unit 202, the motor drive unit 211 and the motor 212. The independence of the first channel from the second channel provides a reduction in the probability of an in-flight shutdown of a propulsion engine so equipped. It also eliminates the possibility of engine shut down due to a single electrical fault or a single point failure. In addition, the possibility of an inability to start the engine due to a single component failure is also eliminated. In either case, i.e. during an in-flight shut down or an inability to start, at least two unrelated faults would be required to cause such failures the probability if which is considered as highly improbable.

The machine 10 may be single or multi-phase. The windings may have single or multi turns per slot, the number of turns of windings does not have to equal the number of turns of control windings, the number of turns of a winding does not necessarily have to be a whole number, the number of primary windings does not have to equal the number of control windings, as one or more windings in a slot may perhaps be present in another slot. A variety of winding types may be used (squirrel cage, lap, etc.), and the windings may be any conductor(s) (i.e. single conductor, more than one wire, insulated, laminated, etc.) or may be superconductors. In multiphase machine, there may be zigzag, delta, or Y-connected windings in accordance with known techniques. There need not be an air gap between the primary and control winding, as long as the windings are electrically isolated from one another.

Figure 5:
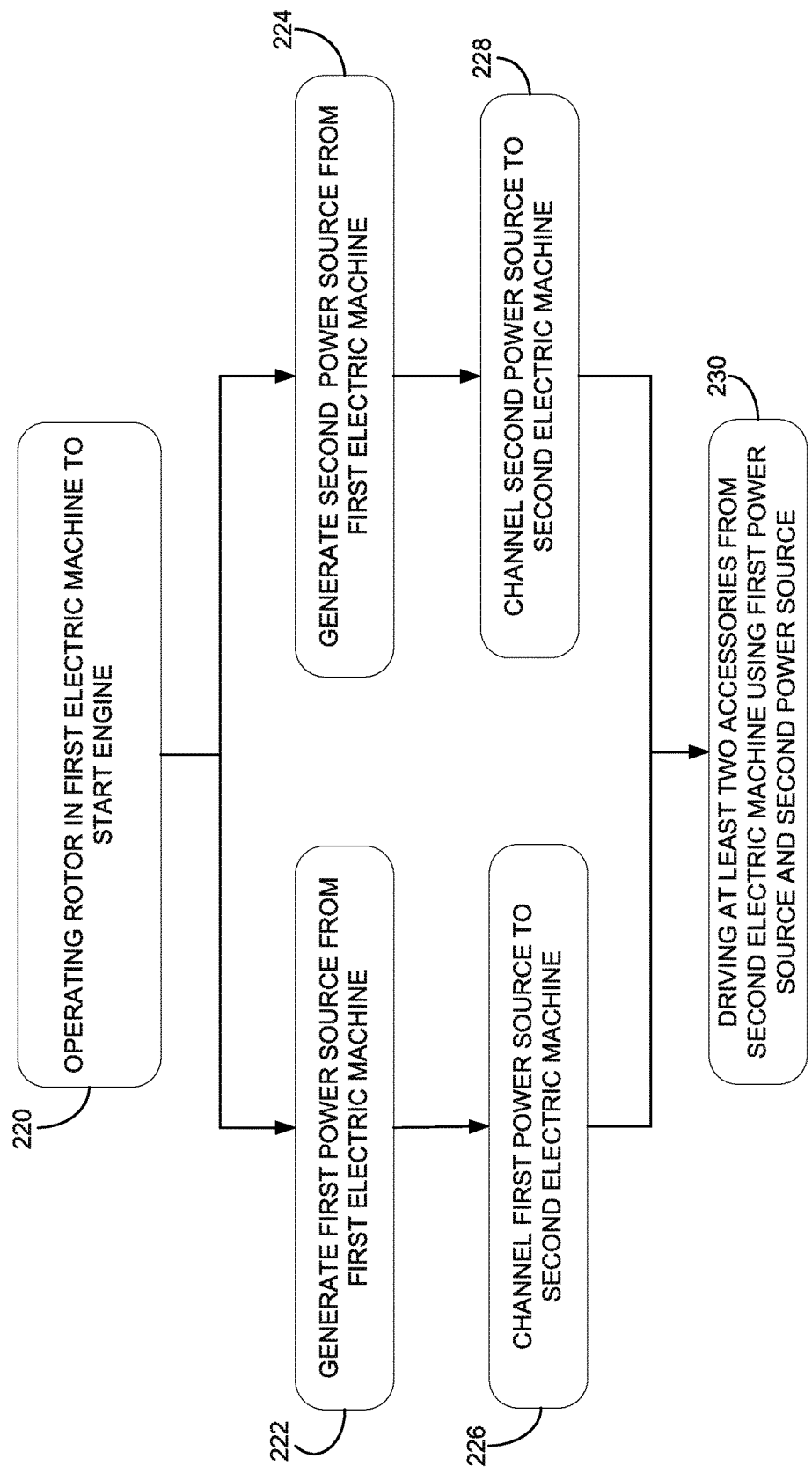
FIG. 5 is a flowchart of an exemplary method for controlling an engine with a system architecture as per FIGS. 3 and 4.

FIG. 5 illustrates the method of controlling an engine using a system architecture as described above. As depicted in FIG. 3, the system comprises a first electric machine with a single rotor dual stator configuration operating as a starter-generator. In a first step 220, the rotor of the first electric machine is operated to rotate and thereby start the engine. Once the engine is started, the interaction of the magnetic field of the rotor in the first electric engine with the dual stator arrangement generates two separate power sources, a first power source 222 and a second power source 224. The first power source is channeled towards the second electric machine via a first channel arrangement composed of the dual channel power control unit and the dual channel motor drive unit 226. The second power source is also channeled to the second electric machine via a second channel arrangement composed of the dual channel power control unit and the dual channel motor drive unit 228. The two independent power sources are used to drive at least two independent accessories using the single rotor dual stator configuration of the second electric machine 230.

In some embodiments, the at least two independent accessories are a fuel delivery system and an oil delivery system, as depicted in FIG. 4. The fuel delivery system may be driven by controlling the speed of delivery of fuel from the fuel pump, and the oil delivery system may be controlled as a function of the fuel delivery speed.

In some embodiments, control of the accessories is done by the dual FADEC 206 and/or the dual PCU 202. Thus, a first channel arrangement composed of the first electric machine, the FADEC, the power control unit, the motor drive unit and the second electric machine may be electrically independent from a second channel arrangement composed of the first electric machine, the FADEC, the power control unit, the motor drive unit and the second electric machine While illustrated in block diagrams as groups of discrete components communicating with each other via distinct data signal connections, it will be understood by those skilled in the art that the present embodiments may be provided by a combination of hardware and software components, with some components being implemented by a given function or operation of a hardware or software system, and some of the data paths illustrated being implemented by data communication within a computer application or operating system. For example, the power control units 202 may be implemented using hardwired logic, Field-Programmable Gate Arrays (FPGAs), analog systems, etc. The structure illustrated is thus provided for efficiency of teaching of the present embodiment, which can be carried out as a method or embodied in a system. The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine comprising:
a first electric machine having a single rotor dual stator configuration for operating as a starter-generator for the engine, the starter-generator having a first starting channel and a second starting channel;
a second electric machine independent from the starter-generator having a single rotor dual stator configuration for operating as a motor to drive accessories of the engine, the motor having a first accessory channel and a second accessory channel;
a dual channel motor drive unit coupled to the second electric machine, the motor drive unit having a first motor drive channel and a second motor drive channel;
a dual channel power control unit coupled to the first electric machine and the motor drive unit, the power control unit having a first power control channel and a second power control channel;
a dual channel full authority digital engine control (FADEC) coupled to the dual channel power control unit and the dual channel motor drive unit; and
at least two accessories, a first of the two accessories coupled to the single rotor of the single rotor dual stator configuration of the second electric machine, a second of the two accessories coupled to the single rotor of the single rotor dual stator configuration of the second electric machine, the at least two accessories driven by motive power from the single rotor of the second electric machine;
wherein the dual channel FADEC is configured to control the first starter channel via the first power control channel and to control the second starter channel via the second power control channel, and the dual channel FADEC is configured to control the first accessory via the first motor drive channel and to control the second accessory via the second motor drive channel.

2. The engine of claim 1, wherein a first channel arrangement composed of the first electric machine, the FADEC, the dual channel power control unit, the dual channel motor drive unit and the second electric machine is electrically independent from a second channel arrangement composed of the first electric machine, the FADEC, the dual channel power control unit, the dual channel motor drive unit and the second electric machine.

3. The engine of claim 1, wherein the engine is one of an electric engine and a more-electric engine.

4. The engine of claim 1, wherein the first electric machine is coupled to a shaft of the gas turbine engine.

5. The engine of claim 1, wherein the at least two accessories are a fuel delivery system and an oil delivery system.

6. A method of controlling an engine, the method comprising:
   operating a first rotor in a first electric machine having a single rotor dual stator configuration as a starter-generator for the engine to rotate the first rotor and thereby start the engine, the starter-generator having a first starting channel and a second starting channel;
   once the engine is started, providing a first power source and a second power source from an interaction of a magnetic field of the first rotor with the dual stator in the first electric machine;
   channeling the first power source towards a second electric machine independent from the first electric machine having a single rotor dual stator configuration via a first power control channel of a dual channel power control unit and a first motor drive channel of a dual channel motor drive unit;
   channeling the second power source towards the second electric machine independently from the first power source via a second power control channel of the dual channel power control unit and a second motor drive channel of the dual channel motor drive unit; and
   driving at least two independent accessories by applying the first power source to a second rotor of the second electric machine via a first stator of the single rotor dual stator configuration and applying the second power source to the second rotor of the second electric machine via a second stator of the single rotor dual stator configuration.

7. The method of claim 6, wherein driving the at least two independent accessories comprises driving a fuel delivery system and an oil delivery system from the second rotor of the second electric machine.

8. The method of claim 6, wherein driving the fuel delivery system and the oil delivery system comprises controlling a speed of delivery of fuel from a fuel pump in the fuel delivery system, and controlling oil delivery as a function of fuel delivery speed.

9. The method of claim 6, further comprising controlling the first electric machine and the second electric machine with a dual channel full authority digital engine control (FADEC).

10. The method of claim 9, wherein controlling the first electric machine and the second electric machine with the FADEC comprises effecting control via the dual channel power control unit and the dual channel motor drive unit.

11. The method of claim 10, wherein a first channel arrangement composed of the first electric machine, the FADEC, the dual channel power control unit, the dual channel motor drive unit and the second electric machine is electrically independent from a second channel arrangement composed of the first electric machine, the FADEC, the dual channel power control unit, the dual channel motor drive unit and the second electric machine.

* * * * *